Oct. 22, 1963 P. B. PRITCHARD 3,107,766
FRICTION ENGAGING DEVICES HAVING A LEVER SPRING
Filed May 3, 1961
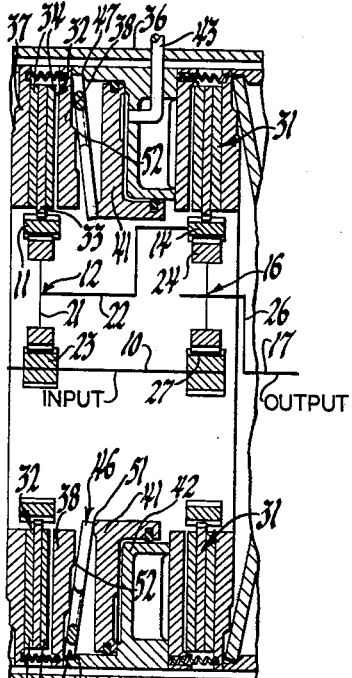
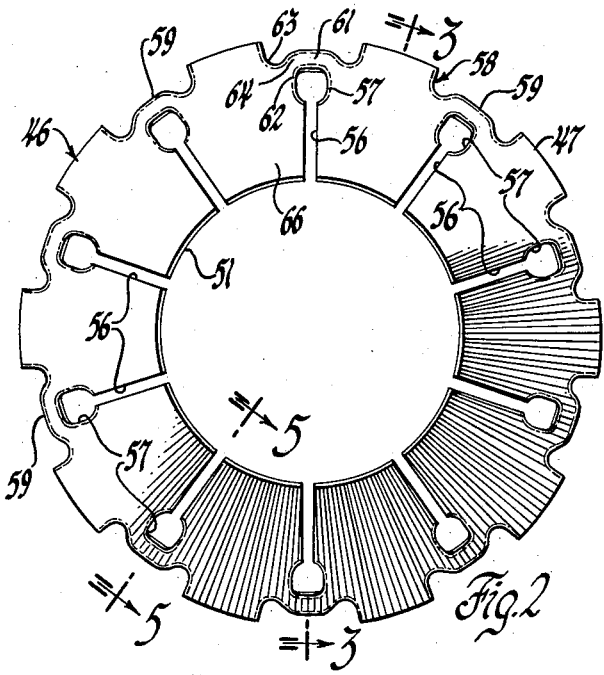
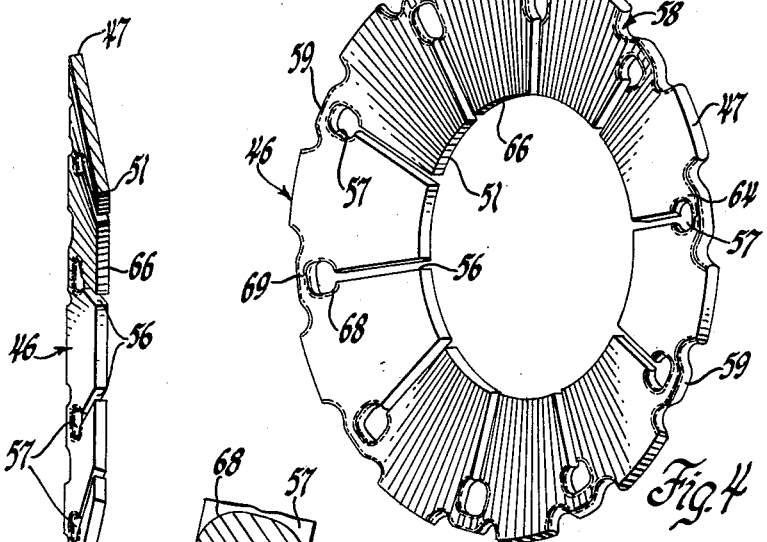
INVENTOR.
Paul B. Pritchard
BY
A. Sm. Neiter
ATTORNEY

United States Patent Office 3,107,766
Patented Oct. 22, 1963

3,107,766
FRICTION ENGAGING DEVICES HAVING
A LEVER SPRING
Paul B. Pritchard, Danville, Ind., assignor to General
Motors Corporation, Detroit, Mich., a corporation of
Delaware
Filed May 3, 1961, Ser. No. 107,522
15 Claims. (Cl. 192—89)

This invention relates to fluid operated friction devices and particularly a lever spring connecting a fluid motor to a friction engaging device.

Friction engaging devices, such as clutches and reaction brakes, employed in automatic or power actuated transmissions are conventionally actuated by motors connected by a lever spring to the packing plate or pressure apply member of the friction engaging device. The lever spring is similar to a Belleville spring in that the cone angle of the spring is changed during compression and return movement of the spring. The spring is also used as a lever to provide an increased mechanical advantage increasing the force applied by the motor and transmitting it to the pressure apply member of the friction engaging device. The annular lever spring member is pivoted or fulcrumed on a circular line to the support and at a circular pressure apply point engages the apply member of a friction device and at another circular pressure apply point is engaged by the motor. During application of the friction engaging device the lever spring is under bending stresses when the spring is considered as a lever. Sections of the spring extending radially or transversely across the annular portion act as a lever. The lever spring member is also subject to the usual bending stresses of a Belleville spring as the cone angle is changed. In a slotted type Belleville spring, these stresses are concentrated in the bridging portions at the ends of the slots which connect the spring lever portions between each pair of slots. In spring levers which are made thicker than the usual Belleville spring to provide a higher beam strength so that greater forces may be transmitted through the lever action of the Belleville spring, the Belleville spring pressure required to change the cone angle would be too high without slotting the annular or disc spring. However, it has been found that when the Belleville spring is merely slotted, there is a high concentration of stresses at the end of the slots which give the spring lever member poor life characteristics due to metal fatigue at this point. Some improvement has been obtained by enlarging the ends of the slot to reduce the stress concentration at the end of the slot by distributing it over a larger area. It has been found that further substantial improvements in the fatigue characteristics of the lever spring may be obtained by designing the lever spring so that the bending stresses, due to the lever action of the spring and due to the change in cone angle during compression of the spring, are applied to different areas of the annular spring member. This may be accomplished by forming the spring lever so that in radial alignment with the slot, the spring lever member does not contact one of the circular pressure contact points, such as the fulcrum. Then in the area of the slot, the spring lever will not be subject to the lever or bending stresses. When this is done by removing a portion of the annular lever spring member at the outer perimeter so that it will not rest against the fulcrum contact point there, the bridging portion at the end of the slot will also be reduced. This arrangement in combination with a D-shaped slot at the terminal end of the slot will provide a long stretch of metal having a uniform and thinner section for flexing between the lever spring segments. The D-shaped slot and the cutout portion are so shaped at each end that there is no abrupt change in section between the thin connecting bridging portion and the lever spring segments. The edges in the critical stress zone may then be coined to round the corners to provide improved metal grain flow and reduce stress concentration which may then be followed by heat treatment and shot peening to provide further favorable fatigue life characteristics.

An object of the invention is to provide in an actuating mechanism for a friction engaging device, an annular lever spring connecting a motor to the pressure apply plate of a friction engaging device constructed and arranged to locate the bending stress in a plurality of lever segments and to locate the flexing stress due to change in the cone angle of the lever spring in other portions of the annular lever spring.

Another object of the invention is to provide in a mechanism for actuating a friction engaging device, a lever disc spring connecting the motor to a pressure apply member for the friction engaging device having a substantially circular force apply fulcrum, a substantially circular support fulcrum and a substantially circular pressure applying fulcrum, one of which is interrupted at the slotted areas of the lever disc spring so that the beam bending stresses due to the lever action of the annular lever spring member are located in certain areas and the stresses due to the change of cone angle in the lever spring are located at other areas.

Another object of the invention is to provide in a slotted lever disc spring an enlarged terminal aperture at the end of the slot and a recess in the edge of the spring opposite the slot provides an elongated bridging portion and to provide a curve at the ends of the slot and the recess to provide a section of increasing thickness to avoid an abrupt change in the section of material between slots to improve the fatigue life characteristics.

These and other objects of the invention will be more apparent from the following description, and drawings of a preferred embodiment.

FIGURE 1 is an elevation in partial section showing a fluid motor connected by a lever spring to actuate a friction engaging device.

FIGURE 2 is a detailed view of the lever spring.

FIGURE 3 is a section of FIGURE 2 on the line 3—3.

FIGURE 4 is a perspective of the lever spring.

FIGURE 5 is a section taken on line 5—5 of FIGURE 2.

The invention is illustrated in an automatic transmission of the type shown in S.N. 554,866, Christenson et al., filed December 22, 1955. FIGURE 1 shows a friction engaging device assembly having a ring gear 11 of a planetary gear set 12 connecting an input member 10 to an output gear 14, or ring gear, of a second planetary gear set 16, driving the output shaft 17. The planetary gear set 12 has a plurality of planetary pinions 21 mounted on a carrier 22 and meshing with a sun gear 23 fixed to the input shaft 10 and the ring gear 11 or reaction member. Planetary gear set 16 has planetary pinions 24 mounted on a carrier 26 connected to the output shaft 17 which mesh with the input driven sun gear 27 and the ring gear 14 connected to carrier 22. It will thus be seen that on engagement of reaction brake 31, low ratio is engaged and on engagement of reaction brake 32 high ratio is engaged. The friction brake 32 consists of a friction disc 33 splined to the ring gear 11 and a pair of friction discs 34 on opposite sides of the friction discs 33 splined to the housing 36. The housing 36 has a fixed abutment portion or backing member 37. The pressure apply plate 38, when moved to the left, engages the plates 33 and 34 against the backing member 37. A fluid motor consisting of a piston 41 having an L-shape and a cylinder 42 moves to the left when fluid under pressure is supplied via line 43 to the space between the piston and the cylinder. The piston 41 is connected to the apply plate 38 by a lever spring 46 having its outer perimeter or circular support fulcrum 47 fitting an annular recess or fulcrum 48 in the housing 36. The piston 41 engages the lever spring 46 at the inner perimeter or circular apply fulcrum 51. The centrally located circular applying fulcrum 52 under lever spring 46 engages the apply plate 38 to apply the engaging force to the apply plate 38.

As shown in FIGURE 2, the lever spring 46 has a generally annular shape and a plurality of radial slots 56 terminating in rounded D-shaped enlarged apertures 57. Immediately opposite each enlarged aperture 57 there is located a recess 58 having a central portion 59 extending substantially the full width of the enlarged aperture 57 to provide an intermediate region or bridging portion 61 of substantially uniform cross-section and substantial length. At the sides of the enlarged apertures 57 there are rounded corners 62 and at the ends of the bridging portion there is a rounded recess 63 to provide a gradually enlarging tapered portion 64 fairing the bridge portion 61 into each lever segment of the spring 66. The edges of the D-shaped slots 57 are rounded or coined as indicated at 68 and the edges of the recess 58 are rounded or coined as indicated at 69. The coining provides a rounded edge in the bridging portion having no sharp corners and having the metal grain flow bending around the corner as indicated in FIGURE 5, at 68 and 69, to provide favorable fatigue life characteristics.

It will be noticed, particularly in FIGURE 1, that the recess 58 removes a portion of the outer fulcrum 47 of the lever spring in the radial region of the slot 56 so that this portion of the lever spring does not contact the support fulcrum 48 and thus there is no lever bending stress in this area and particularly on the bridge portion 61. The narrow bridging portions 61, due to their reduced section, take all of the deformation due to the bending stress required to change the cone angle of the lever spring. In this way, distinct and separate portions of the lever spring are provided to resist the bending forces due to the lever action and the stress due to the change in cone angle of the disc spring. In the preferred embodiment, the bridging portion 61 is circumferentially longer than its radial width and preferably should have a length about as large as the width in order to avoid high stress concentration in this area.

The above disclosed preferred embodiment is illustrative of the invention which may be modified within the scope of the appended claims.

I claim:

1. In apparatus of the character described, a support, a force applying member mounted on said support for reciprocal movement along the axis of the support, a force receiving member mounted on said support for axial reciprocal movement, an annular lever spring member having three substantially circular fulcrums and being supported and fulcrumed at one fulcrum on said support and having another fulcrum contacting said force receiving member and a third fulcrum engaging said force applying member, said annular lever spring member having a plurality of radial slots therein extending from one perimeter toward the other perimeter and a plurality of recesses in said other perimeter opposite each radial slot positioned to interrupt one of said fulcrums to provide alternate and intermediate regions, said alternate regions being adjacent said slots subject only to the bending stress involved in changing the cone angle of the annular lever spring member and said intermediate regions acting only as a lever to transmit force from the force apply member to the force receiving member and subject to lever beam stresses.

2. In apparatus of the character described, a support, a force applying member mounted on said support for reciprocal movement along the axis of the support, a force receiving member mounted on said support for axial reciprocal movement, an annular lever spring member having three circular fulcrums and being supported and fulcrumed at one circular fulcrum on said support and having another circular fulcrum contacting said force receiving member and a third circular fulcrum engaging said force applying member, said annular lever spring member having a plurality of radial slots therein extending from one perimeter toward the other perimeter and terminating in an end portion and a plurality of recesses in said other perimeter, one recess being located radially opposite the end portion of each radial slot positioned to interrupt one of said fulcrums over a greater part of the circumferential length of the fulcrum than the width of said slots to provide alternate and intermediate regions, said alternate region between said slots and recesses and adjacent said slots subject only to the bending stress involved in changing the cone angle of the annular lever spring member and said intermediate regions acting only as a lever to transmit force from the force apply member to the force receiving member and subject to lever beam stresses.

3. In apparatus of the character described, a support, a force applying member mounted on said support for reciprocal movement along the axis of the support, a force receiving member mounted on said support for axial reciprocal movement, an annular lever spring member having three circular fulcrums and being supported and fulcrumed at one circular fulcrum on said support and having another circular fulcrum contacting said force receiving member and a third circular fulcrum engaging said force applying member, said annular lever spring member having a plurality of radial slots therein extending from the inner perimeter toward the outer perimeter and a plurality of recesses in said outer perimeter opposite each radial slot positioned to interrupt one of said fulcrums over a greater circumferential distance than said slots to provide alternate and intermediate regions, said alternate regions adjacent said slots subject only to the bending stress involved in changing the cone angle of the annular lever spring member and said intermediate regions acting only as a lever to transmit force from the force apply member to the force receiving member and subject to lever beam stresses.

4. In apparatus of the character described, a support, a force applying member mounted on said support for reciprocal movement along the axis of the support, a force receiving member mounted on said support for axial reciprocal movement, an annular lever spring member pivotally fulcrumed at a circular support fulcrum at its external perimeter on said support and having an intermediate circular force fulcrum line and a circular force fulcrum line adjacent the inner perimeter, one of said force fulcrum lines contacting said force receiving member and the other engaging said force applying member, said annular lever spring member having a plurality of radial slots therein and a plurality of recesses in said external perimeter opposite each radial slot to interrupt the said support fulcrum over a greater circumferential distance than the width of said slots to provide alternate and intermediate regions, said alternate regions adjacent the slots subject only to the bending stress involved in changing the cone angle of the annular lever spring member and said intermediate regions acting only as a lever to transmit force from the force apply member to the force receiving member and subject to lever beam stresses.

5. In apparatus of the character described, a support, a force applying member mounted on said support for reciprocal movement along the axis of the support, a force receiving member mounted on said support for axial reciprocal movement, an annular lever spring member pivotally fulcrumed at a circular support fulcrum at its external perimeter on said support and having an intermediate circular fulcrum line contacting said force receiving member and a circular fulcrum line adjacent the inner perimeter engaging said force applying member, said annular lever spring member having a plurality of radial slots therein and a plurality of recesses in the external perimeter opposite each radial slot to interrupt said support fulcrum for a greater circumferential extent than the width of said slots to provide alternate and intermediate regions, said alternate regions being adjacent said slots subject only to the bending stress involved in changing the cone angle of the annular lever spring member and said intermediate regions acting only as a lever to transmit force from the force apply member to the force receiving member and subject to lever beam stresses.

6. In apparatus of the character described, a support, an annular force applying member mounted on said support for reciprocal movement along the axis of the support, an annular force receiving member mounted on said support for axial reciprocal movement, an annular lever spring member pivotally fulcrumed at a circular support fulcrum at its external perimeter on said support and having an intermediate circular fulcrum line contacting said force receiving member and a circular fulcrum line adjacent the inner perimeter engaging said force applying member, said annular lever spring member having a plurality of radial slots therein and a plurality of recesses in the external perimeter opposite each radial slot to interrupt said support fulcrum for a greater circumferential distance than the width of said slots to provide alternate and intermediate regions, said alternate regions adjacent said slots subject only to the bending stress involved in changing the cone angle of the annular lever spring member and said intermediate regions acting only as a lever to transmit force from the force apply member to the force receiving member and subject to lever beam stresses.

7. In apparatus of the character described, a support, a force applying member mounted on said support for reciprocal movement along the axis of the support, a force receiving member mounted on said support for axial reciprocal movement, an annular lever spring member having three circular fulcrums and being supported and fulcrumed at one circular fulcrum on said support and having another circular fulcrum contacting said force receiving member and a third circular fulcrum engaging said force applying member, said annular lever spring member having a plurality of radial slots therein extending from one perimeter toward the other perimeter, and having a terminal enlargement and a plurality of recesses in said other perimeter opposite each terminal enlargement of a radial slot and said recesses having a greater circumferential length than the circumferential length of said terminal enlargements dividing the member into a plurality of lever portions and shaped to provide a narrow elongated bridge portion gradually faired into the adjacent lever sections on opposite sides of each slot and said recesses being positioned to interrupt one of said fulcrums for a greater circumferential length than the circumferential length of said terminal enlargements to provide in said bridge portions between said lever sections only bending stress involved in changing the cone angle of the annular lever spring member and in the lever portions acting only as a lever to transmit force from the force apply member to the force receiving member lever beam stresses involved in the lever action of these portions.

8. In a lever spring adapted to transmit a force from one member to another member and being fulcrumed on a support, an annular spring member, a plurality of radial slots extending from one perimeter to a point adjacent the other perimeter, a recess in said other perimeter of said annular spring radially aligned with said slots and extending at said other perimeter peripherally beyond said slots, said spring member providing generally circular inner, intermediate and outer fulcrums, and said recesses interrupting one fulcrum for a circumferential distance greater than the circumferential width of said slots so that there is no lever bending stress along radial lines in the region of said slots.

9. In a lever spring adapted to transmit a force from one member to another member and being fulcrumed on a support, an annular spring member, a plurality of radial slots extending from the internal perimeter to a point adjacent the external perimeter, a recess in the external perimeter of said annular spring radially aligned with said slots and extending peripherally interrupting said external perimeter over a portion substantially wider than said slots, said spring member providing generally circular inner, intermediate and outer fulcrums, and said recesses interrupting said outer fulcrum for a circumferential distance extending transversely of said slots and significantly beyond on each side so that there is no lever bending stress along radial lines in the region of said slots.

10. In a lever spring adapted to transmit a force from one member to another member and being fulcrumed on a support, an annular spring member, a plurality of radial slots extending from the internal perimeter to a point adjacent the external perimeter, a recess in the external perimeter of said annular spring radially aligned with said slots and extending peripherally beyond said slots at said external perimeter, said spring member providing generally circular inner, intermediate and outer fulcrums, and said recesses interrupting said outer fulcrum over a distance extending across each slot and significantly beyond each slot so that there is no lever bending stress along radial lines in the region of said slots.

11. In a lever spring adapted to transmit a force from one member to another member and being fulcrumed on a support, an annular spring member, a plurality of radial slots extending from one perimeter toward the other and having a terminal enlargement, a recess in the other perimeter of said annular spring radially aligned with said slots, and extending at said other perimeter peripherally beyond said slots, and located with respect to said terminal enlargement to provide a narrow elongated portion having a greater length than the width of said slots connecting the portions of the spring member between said slots.

12. In a lever spring adapted to transmit a force from one member to another member and being fulcrumed on a support, an annular spring member, a plurality of radial slots extending from the internal perimeter and having a terminal enlargement adjacent the external perimeter, a recess in the external perimeter of said annular spring radially aligned with each of said slots, and extending peripherally at said external perimeter circumferentially beyond each side of each of said slots, and located with respect to said terminal enlargement to provide a narrow elongated portion having a greater length and the width of said slots connecting the portions of the spring member between said slots.

13. In a lever spring adapted to transmit a force from one member to another member and being fulcrumed on a support, an annular spring member, dividing means including a plurality of radial slots extending from one perimeter toward the other and a recess in said other perimeter of said annular spring radially aligned with said slots and extending peripherally at said other perimeter beyond each side of said slots dividing said spring member into a plurality of lever sections, said spring member having generally circular inner, intermediate and outer fulcrums, and said recesses interrupting one fulcrum so that there is no lever bending stress along radial lines in the region of said slots.

14. In a lever spring adapted to transmit a force from one member to another member and being fulcrumed on a support, an annular lever spring member having means localizing the stress due to spring movement and dividing said annular lever spring member into a plurality of lever sections and intermediate sections, said spring member having generally circular inner, intermediate and outer fulcrums, and at least one of said fulcrums being interrupted over said intermediate sections so that there are no lever bending stresses along radial lines in said intermediate sections.

15. In apparatus of the character described, a support, a force applying member mounted on said support for reciprocal movement along the axis of the support, a force receiving member mounted on said support for axial reciprocal movement, an annular lever spring member having three circular fulcrums and being supported and fulcrumed at one circular fulcrum on said support and having another circular fulcrum contacting said force receiving member and a third circular fulcrum engaging said force applying member, said annular lever spring member having means localizing bending movement due to change in cone angle of said annular lever spring member in a plurality of spring sections and providing a plurality of intermediate stiffer lever sections, means to interrupt one of said fulcrums in said spring sections to provide spring sections subject only to the bending stress involved in changing the cone angle of the annular lever spring member and intermediate lever sections acting only as a lever to transmit force from the force apply member to the force receiving member and subject only to lever beam stresses.

References Cited in the file of this patent

UNITED STATES PATENTS

| | | |
|---|---|---|
| 2,229,319 | Wesselhoff | Jan. 21, 1941 |
| 2,485,214 | Peterson et al. | Oct. 18, 1949 |
| 2,706,491 | Kohler | Apr. 19, 1955 |
| 2,725,964 | Maurer | Dec. 6, 1955 |
| 2,952,453 | Haussermann | Sept. 13, 1960 |